March 12, 1940. C. H. HEMPEL ET AL 2,193,513
METHOD OF FORMING DISHED LAMINATED ARTICLES
Filed May 4, 1938 2 Sheets-Sheet 1
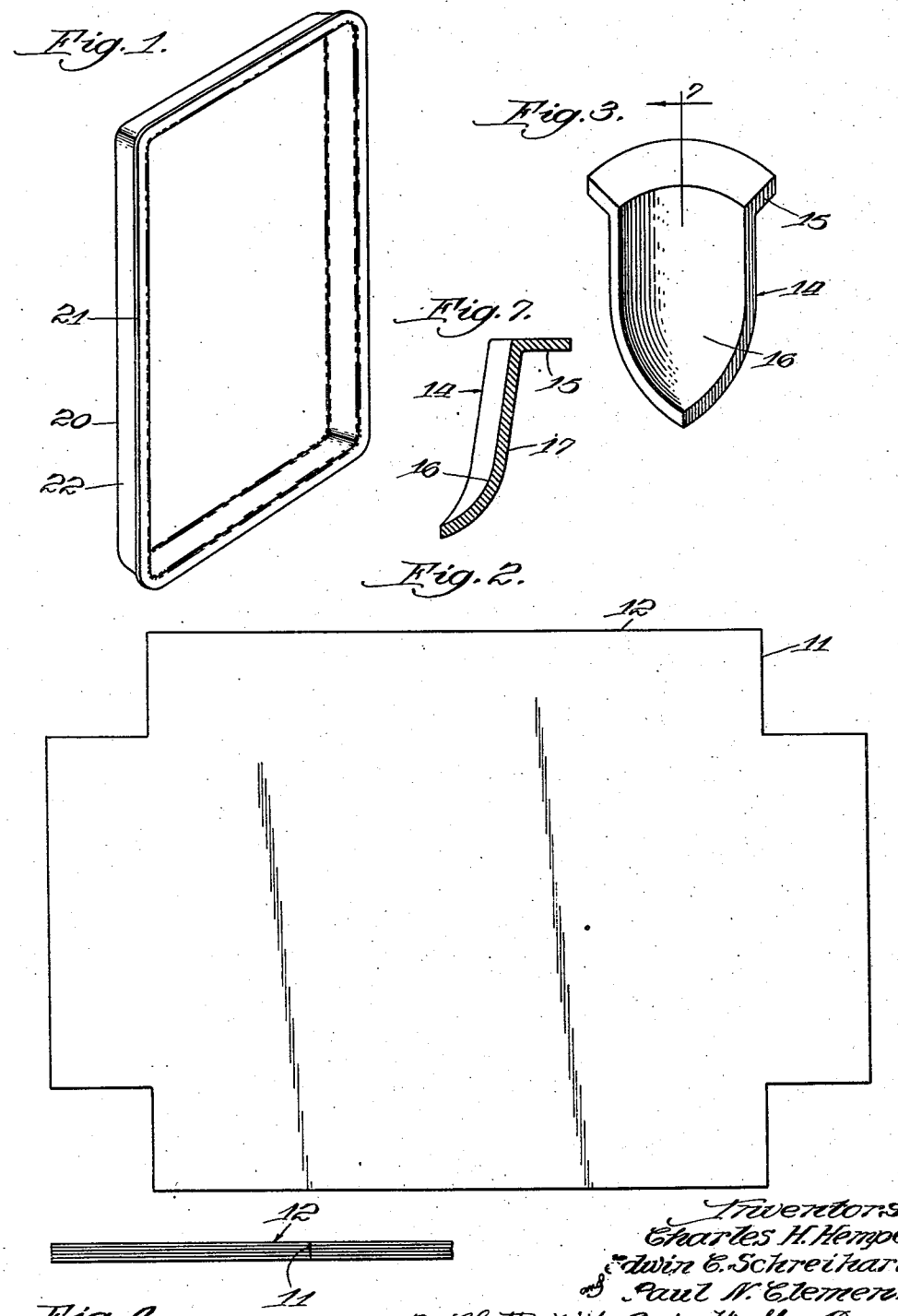

March 12, 1940.    C. H. HEMPEL ET AL    2,193,513
METHOD OF FORMING DISHED LAMINATED ARTICLES
Filed May 4, 1938    2 Sheets-Sheet 2

Inventors:
Charles H. Hempel,
Edwin C. Schreihart
and Paul N. Clemens.
By Chritton, Wiles, Davis, Hirsch & Dawson,
Attys.

Patented Mar. 12, 1940

2,193,513

UNITED STATES PATENT OFFICE 2,193,513

METHOD OF FORMING DISHED LAMINATED ARTICLES

Charles H. Hempel, Edwin C. Schreihart, and Paul N. Clemens, Manitowoc, Wis., assignors to Heresite & Chemical Company, a corporation of Wisconsin Application May 4, 1938, Serial No. 206,064

3 Claims. (Cl. 18—59)

This invention relates to the manufacture of dished laminated articles and particularly to the formation of inner door panels for refrigerators.

It has heretofore been impracticable to prepare molded and particularly laminated inner door panels for refrigerators without considerable wrinkling and overlapping on account of the bending thereof.

In accordance with this invention, unwrinkled and structurally uniform panels of this type, or other similar dished objects, may be prepared from laminated materials with great simplicity.

Figure 5:
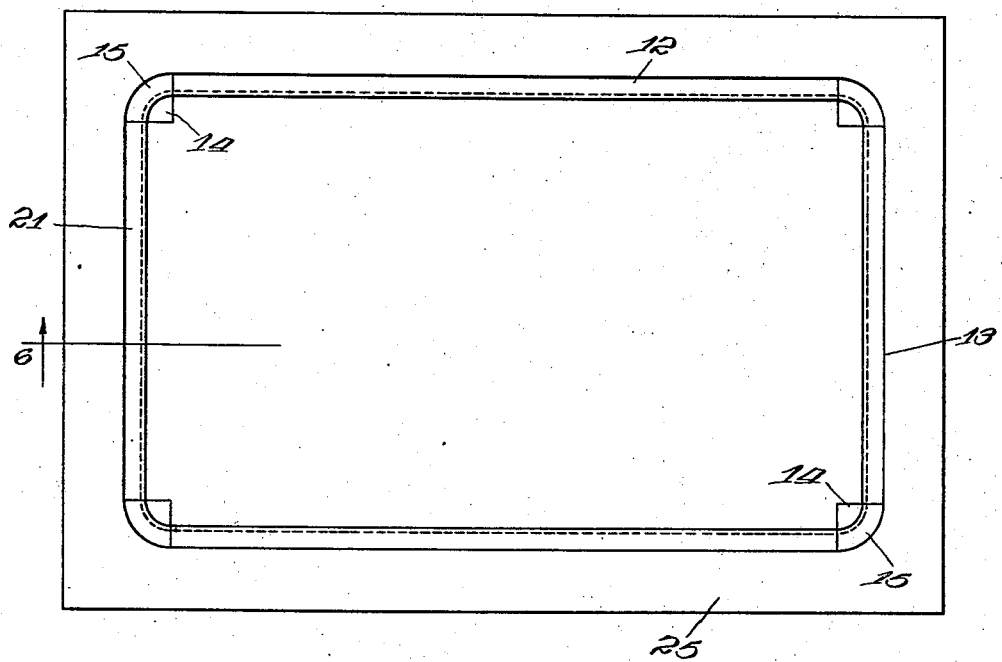
Figure 6:
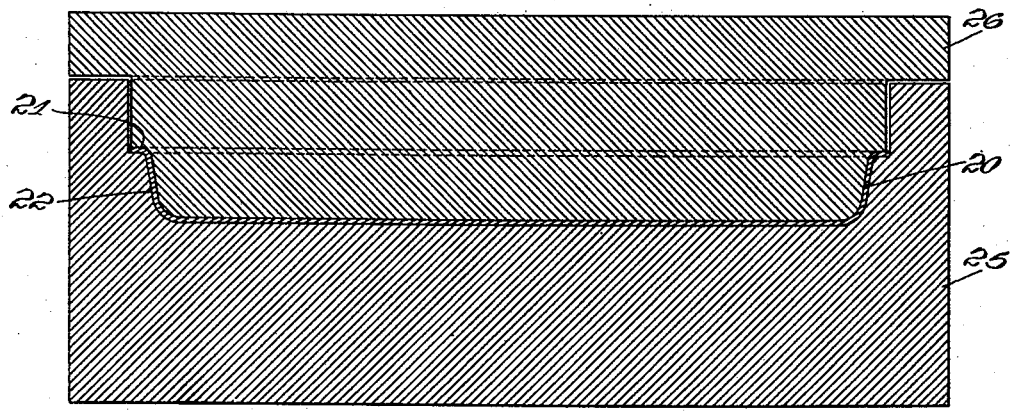

The invention is illustrated in the drawings in which Fig. 1 is a perspective view of a completed panel; Fig. 2 is a plan view of a blank of sheets therefor; Fig. 3 is a perspective view of a preform for the corner; Fig. 4 is a sectional view through Fig. 2 illustrating the plies of material; Fig. 5 is a plan view of the lower half of the mold with the parts assembled in it; Fig. 6 is a sectional elevation along the line 6 in Fig. 5, but with the upper half of the mold in place; and Fig. 7 is a sectional view along the line 7 in Fig. 3.

The laminated material for the panel may be prepared in any suitable manner employing any suitable resin. Preferably, the laminations comprise impregnated or coated pieces of paper, canvas, fabrics, metals or combinations thereof. The molding composition may be a neutral or synthetic permanently thermoplastic one, or a thermosetting material, an impact molding material, or other suitable plastic. Preferably, a phenol formaldehyde type resin is employed.

As an example of the invention, a pile of laminated sheets, for instance 30 sheets of thin textile material impregnated with phenol formaldehyde resin, are superimposed and pressed together, preferably under sufficient heat to bring the resin approximately into the B stage. The corners 11 of the panel 12 are then cut out as indicated in Fig. 2. The panel is placed in a die 13 in which preformed corner pieces 14 have previously been set. The corner members are quartered curved members provided with a lip 15, a concave inner face 16 and a convex outer face 17 shaped to conform to the ultimate corners of the panel.

These corner members 14 are preferably of unlaminated plastic material of the same type as that used in the panel 12. The panel 12 is set over the mold 25 as indicated in Fig. 5 and then the upper portion 26 of the mold is lowered with heat and pressure as indicated in Fig. 6 to form the dished member 20 as shown in Fig. 1. During this process the panel 12 is upset to form the lip 21 and the side portions 22 and the edges of these portions merge with the corner members 14 to provide a strong integral and wrinkle-free member 20.

The corner members may be preformed by cold molding any suitable mold powder, for example, a phenol formaldehyde resin under heavy pressure.

For example, a suitable pressure is 600 pounds per square inch at atmospheric temperatures.

The invention may be used in the manufacture of any formed object of upset shape where the entire body cannot be given the requisite strength by using a molding powder alone and where the use of laminated material for the whole object would result in undesirable wrinkling.

The foregoing detailed description has been given for clearness of understanding only, and no unnecessary limitations should be understood therefrom, but the appended claims should be construed as broadly as permissible in view of the prior art.

We claim:

1. The method of forming a dished body, which comprises preparing a laminated plastic impregnated body member adapted to form the bottom and sides of said dished device, said body member being provided with rectangular cut-out portions at the corners, preparing preformed upset corner members from plastic material, and then molding body and corners together to form an integral dished member.

2. The method of forming a dished body, which comprises preparing a laminated plastic impregnated body member adapted to form the bottom and sides of said dished device, said body member being provided with cut-out portions at the corners, preparing preformed upset corner members from plastic material, and then molding body and corners together to form an integral dished member.

3. The method of forming a refrigerator door panel with beveled edges and unbroken rounded corners, which comprises preparing a body member adapted to form the bottom, sides and beveled edges of the panel, said body member being provided with cutout portions at the corners, preparing preformed upset corner members from plastic material, and then molding body and corners together to form an integral panel.

CHARLES H. HEMPEL.
EDWIN C. SCHREIHART.
PAUL N. CLEMENS.